US010896231B2

(12) United States Patent
Muthuregunathan et al.

(10) Patent No.: US 10,896,231 B2
(45) Date of Patent: Jan. 19, 2021

(54) QUERYING NAMED ENTITIES

(71) Applicant: Microsoft Technology Licensing, LLC, Redmond, WA (US)

(72) Inventors: Raghavan Muthuregunathan, Sunnyvale, CA (US); Abhimanyu Lad, San Mateo, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 283 days.

(21) Appl. No.: 15/856,383

(22) Filed: Dec. 28, 2017

(65) Prior Publication Data

US 2019/0205471 A1 Jul. 4, 2019

(51) Int. Cl.
*G06F 16/00* (2019.01)
*G06F 16/9535* (2019.01)
*G06F 16/33* (2019.01)
*G06F 16/332* (2019.01)
*G06F 40/232* (2020.01)
*G06F 40/295* (2020.01)
*G06N 20/00* (2019.01)

(52) U.S. Cl.
CPC ........ *G06F 16/9535* (2019.01); *G06F 16/334* (2019.01); *G06F 16/3323* (2019.01); *G06F 40/232* (2020.01); *G06F 40/295* (2020.01); *G06N 20/00* (2019.01)

(58) Field of Classification Search
CPC .................. G06F 16/9535; G06F 16/9536
See application file for complete search history.

(56) References Cited

U.S. PATENT DOCUMENTS

| 9,489,513 | B1* | 11/2016 | Mesropian | G06F 21/566 |
|---|---|---|---|---|
| 2009/0199213 | A1* | 8/2009 | Webster | G06F 9/54 |
| | | | | 719/320 |
| 2011/0137902 | A1* | 6/2011 | Wable | G06F 16/9535 |
| | | | | 707/737 |
| 2017/0147696 | A1* | 5/2017 | Evnine | G06F 16/41 |

\* cited by examiner

*Primary Examiner* — Thu Nguyet T Le
(74) *Attorney, Agent, or Firm* — Schwegman Lundberg & Woessner, P.A.

(57) ABSTRACT

In various example embodiments, a system and method for modifying user input are presented. In one embodiment, a method includes receiving electronic input from a member of a social networking service, the input comprising a named entity; transmitting a query to a database of entities connected to the social networking service to select a set of entities in the database whose names are within a character edit distance of a spelling of the named entity; identifying a matching entity that is connected to the member at the social networking service and matches an entity in the set of entities; and modifying the input by replacing the spelling of the named entity with a spelling of the matching entity.

17 Claims, 8 Drawing Sheets

QUERYING NAMED ENTITIES

TECHNICAL FIELD

The present application relates generally to systems and methods for querying named entities, and more specifically to modifying a query for a named entity according to attributes of a member providing the query.

BACKGROUND

A user may interact with a social networking service in a wide variety of different ways. In one example, a member of a social networking service seeks an entity to connect to, and provides a name to the social networking system.

In certain examples, the member provides an inaccurate spelling of the named entity. Although the inaccurate spelling may match another entity of the social networking service, the matched entity may not be the entity the member seeks. Determining a correct entity according to a spelling of the entity is difficult.

BRIEF DESCRIPTION OF THE DRAWINGS

Various ones of the appended drawings merely illustrate example embodiments of the present disclosure and cannot be considered as limiting its scope.

Figure 1:
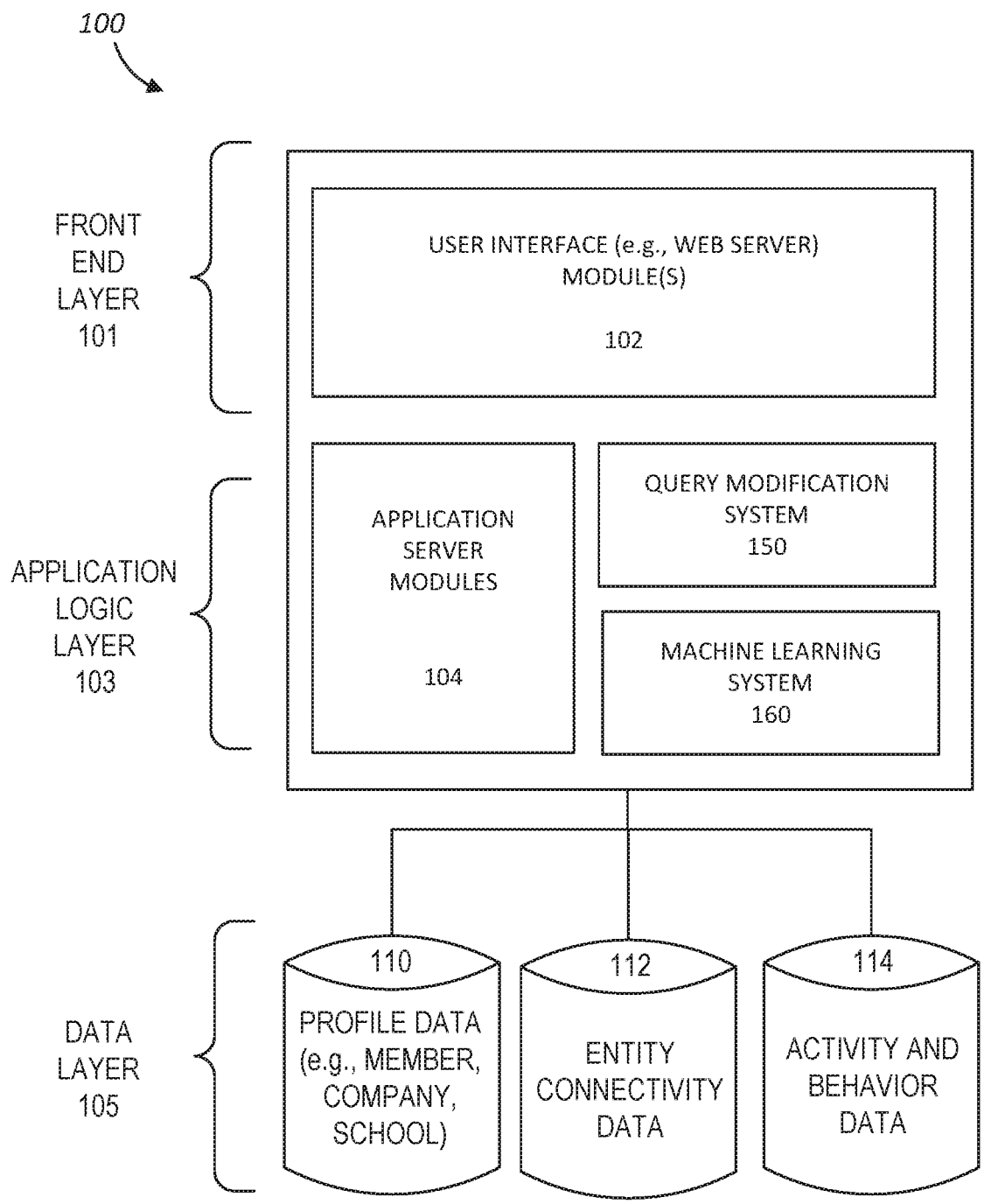
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The spelling of proper nouns and named entities is a difficult problem. People spell their names in many different ways. In some examples, the spelling of the name is consistent with traditional spellings. In other examples, the spelling of the name is not consistent with traditional spellings.

As described herein, a system is configured to modify a member query that includes a named entity according to how the member is connected at the social networking service. In one example, the member desires to view a profile page for "Frederik Ginsberg" with whom the member is connected via the social networking service. The member may search for "Frederick GinSberg," not realizing the inaccurate spelling. Although there is a member at the social networking service named "Frederick Ginsberg," it is more likely that the member is looking for "Frederik Ginzberg" with whom the member is directly connected. Thus, the system is configured to modify the spelling "Frederick Ginsberg" to "Frederik Ginzberg." This is especially the case in response to the member having never connected with, or ever communicated with, "Frederick Ginsberg." Thus, using the member's connections or communications with other members, the system may more accurately modify spellings of named entities in a member query.

In other examples, the system is configured to modify the spelling of a named entity according to one or more similarities between the member and named entities. In one example embodiment, the system identifies an entity with whom the member has communicated and modifies the spelling of a named entity accordingly. For example, where a member has interacted with a named entity "Ballz, Inc," and the member searches for "Balls. Inc," the system may infer the intended spelling of the entity. This may occur even though a "Balls. Inc." may be a valid named entity at the social networking service. Thus, a member's connection and/or attributes may be a preferred metric for modifying input comprising a named entity.

In another example embodiment, the system extracts features from the member. For example, the system may extract the precise spelling of the named entity, network connections of the member, named entities that closely match the precise spelling, and network connections of the named entities that closely match the precise spelling.

In one example embodiment, the system modifies the spelling of a named entity according to an entity that is in the same industry as the member. For example, where the member is a software engineer and is searching for a named entity "BestCoders." If the member is using voice recognition, an enunciation of "BestCoders" may result in "BestCoaters," or the like. In this example, the system could modify the spelling of "BestCoaters" to "BestCoders" because "BestCoders" is in the same industry (software engineering) as the member. In another example embodiment, the system considers other profile attributes that are similar to profile attributes for named entities at the social networking service as described herein.

FIG. 1 is a block diagram illustrating various components or functional modules of a social networking service 100, in an example embodiment. In one example, the social networking service 100 includes a query modification system 150 that performs many of the operations described herein, and a machine learning system 160.

A front end layer 101 consists of one or more user interface modules (e.g., a web server) 102, which receive requests from various client computing devices and communicate appropriate responses to the requesting client devices. For example, the user interface module(s) 102 may receive requests in the form of Hypertext Transfer Protocol (HTTP) requests, or other web-based application programming interface (API) requests. In another example, the front end layer 101 receives requests from an application executing via a member's mobile computing device. In one example embodiment, the member requests a named member of the social networking service 100 from the query modification system 150. As described herein, the query modification system 150 identifies an intended entity and transmits the intended entity to the member's mobile computing device or other device being used by the member.

An application logic layer 103 includes various application server modules 104, which, in conjunction with the user interface module(s) 102, may generate various user interfaces (e.g., web pages, applications, etc) with data retrieved from various data sources in a data layer 105. In one example embodiment, the application logic layer 103 includes the query modification system 150.

In some examples, individual application server modules 104 may be used to implement the functionality associated with various services and features of the social networking service 100. For instance, the ability of an organization to establish a presence in the social graph of the social networking service 100, including the ability to establish a customized web page on behalf of an organization, post available employment positions, and to publish messages or status updates on behalf of an organization, may be a service implemented in independent application server modules 104. Similarly, a variety of other applications or services that are made available to members of the social networking service 100 may be embodied in their own application server modules 104. Alternatively, various applications may be embodied in a single application server module 104.

As illustrated, the data layer 105 includes, but is not necessarily limited to, several databases 110, 112, 114, such as a database 110 for storing profile data, including both member profile data and profile data for various organizations, name cluster data, member interactions, member queries, or the like. In another example embodiment, the database 114 stores member activity and behavior data, interactions, messages, and other activities that may be used by the query modification system 150 to modify a member's input. The database 112 stores member connectivity and connections between named entities of the social networking service 100.

Consistent with some examples, when a person initially registers to become a member of the social networking service 100, the person may be prompted to provide some personal information, such as his or her name, age (e.g., birthdate), gender, sexual orientation, interests, hobbies, contact information, home town, address, spouse's and/or family members' names, educational background (e.g., schools, majors, matriculation and/or graduation dates, etc.), occupation, employment history, employment preferences (e.g., location, company size, employer industry, etc.) skills, religion, professional organizations, and other properties and/or characteristics of the member. In one example embodiment, the social networking service 100 asks whether the member desires to participate in a program that implements the query modification system 150. This information is stored, for example, in the database 110. Similarly, when a representative of an organization initially registers the organization with the social networking service 100, the representative may be prompted to provide certain information about the organization. This information may be stored, for example, in the database 110, or another database (not shown).

The social networking service 100 may provide a broad range of other applications and services that allow members the opportunity to share and receive information, which is often customized to the interests of the member. For example, in some examples, the social networking service 100 may include a message sharing application that allows members to upload and share messages with other members. In some examples, members may be able to self-organize into groups, or interest groups, or other named entities organized around a subject matter or topic of interest.

As members interact with the various applications, services, and content made available via the social networking service 100, information concerning content items interacted with, such as by viewing, playing, and the like, may be monitored, and information concerning the interactions may be stored, for example, as indicated in FIG. 1 by the database 114. In certain example embodiments, the database 114 stores member interactions such as, but not limited to, viewing received messages, clicking a link in a received message, updating a member profile, updating a specific parameter of a member profile, setting a profile indicator, using a specific term in the member profile, searching for alternative roles, reviewing job postings (e.g., available employment positions, requesting to receive notification of alternative roles, or other actions or interactions with the social networking service 100 that indicate an inclination to modify a current role for the member.

Although not shown, in some examples, the social networking service 100 provides an API module via which third-party applications can access various services and data provided by the social networking service 100. For example, using an API, a third-party application may provide a user interface and logic that enables the member to submit and/or configure a set of rules used by the query modification system 150. Such third-party applications may be browser-based applications or may be operating system specific. In particular, some third-party applications may reside and execute on one or more mobile devices (e.g., phones or tablet computing devices) having a mobile operating system.

Figure 2:
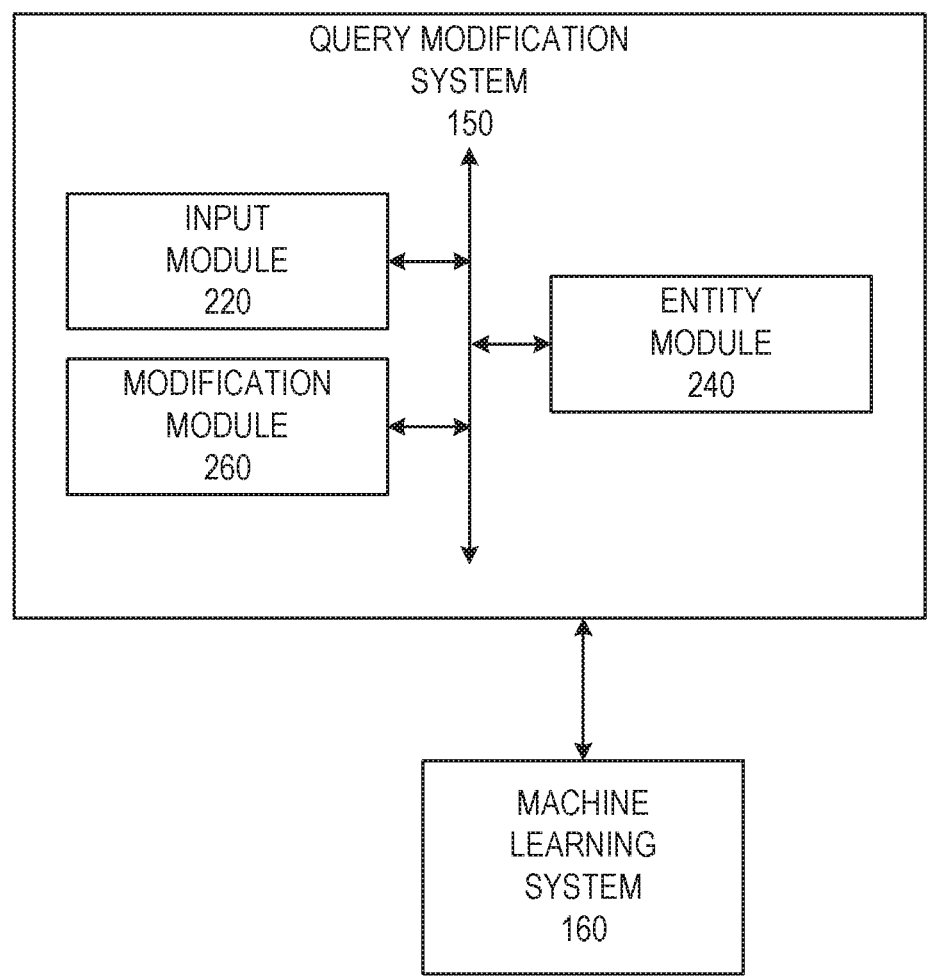
FIG. 2 is a block diagram of a query modification system, according to one example embodiment.

FIG. 2 is a block diagram of a query modification system 150, according to one example embodiment. The query modification system 150 includes an input module 220, an entity module 240, and a modification module 260. The query modification system 150 may also communicate with a machine learning system 160 as will be further described.

In one example embodiment, the input module 220 is configured to receive electronic input from a member of the social networking service 100. As one skilled in the art may appreciate, the input may be received in a variety of different ways. For example, the input module 220 may execute on the client device and receive input via an electronic user interface. In another example, the input module 220 receives one or more network packets from a client device being used by the member.

In another example embodiment, the input module 220 transmits a query to a database 112 of entities connected to the social networking service 100. In one example, the query is an SQL structured query that selects named entities from the database 112. In one example, the named entities are those named entities connected to the social networking service 100 whose names are within a character edit distance.

As described herein, a character edit distance includes a number of character edits needed to alter the spelling of the named entity in the input to the spelling of a named entity in the database 112. For example, adding a character is one character edit operation, removing a character is another edit operation, substituting one character for another is another character edit operation, and transposing two characters is a single character edit operation. Therefore, a character difference between spellings of named entities may be described as a character edit distance.

In one example, a member submits input to search for a named entity "Michael" and the input module 220 searches for named entities in the database whose names are within a threshold character edit distance of three. In this example, the following would match: "Micael" (one character removed), "Miichael" (one character added), "Mickael" (one character changed), "Michaelle" (two characters added). Other examples include "Hema Ragavan" and "Hema Raghavan" (an additional 'h'), "Rebeka Johnson" and "Rebekah Johnson" (an extra 'h'), "Jeff Pasternack" and "Jeff Pasternak" (an additional 'c'), "Mark" and "Marc" (changing a 'k' to a 'c'), and many others.

The input module 220, after submitting the query to the database 112, receives one or more named entities registered with the social networking service 100 whose names are within the character edit distance (e.g., the names that match a query constructed to search for names within the character edit distance).

In one example embodiment, the entity module 240 is configured to identifying a matching entity that is connected to the member at the social networking service 100 and matches an entity in the set of entities. For example, the entity module 240 may retrieve, from the database 112, each entity (e.g., member) that the member is connected to, and compare each of them with each entity in the retrieved set of entities by the input module 220.

Figure 4:
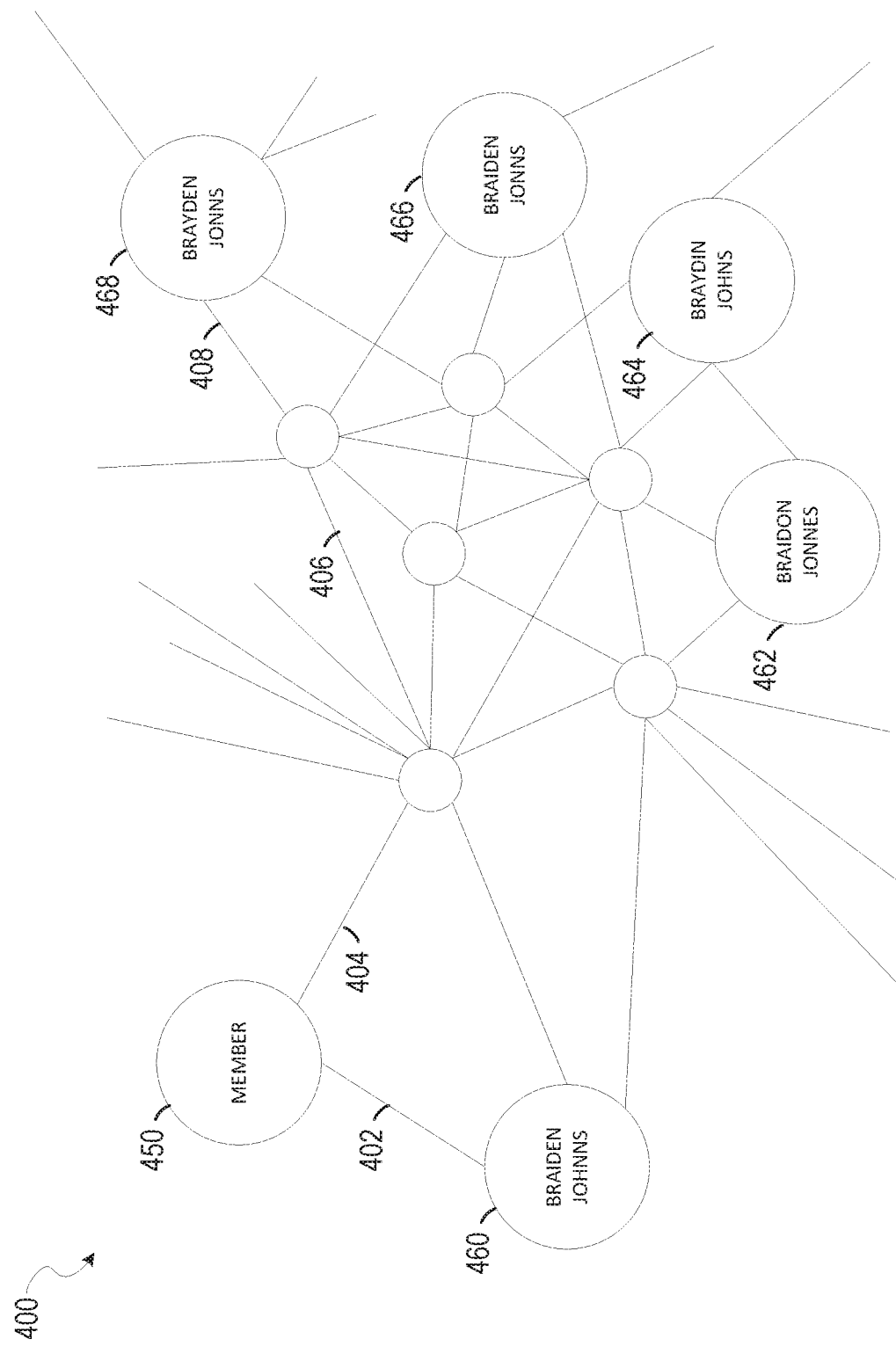
FIG. 4 is an illustration depicting a social network according to one example embodiment.

In response to the name of a connected entity matching a name of an entity in the set entities, the entity module 240 identifies the entity as one that the member intended. In another example embodiment, the entity module 240 ranks the connected entities according to a connection distance from the member. For example, where an entity is directly connected to the member, the entity may be ranked above other entities that are connected to the member by two or more connections. Further examples of network connections are indicated in FIG. 4.

In another example embodiment, the entity module 240 ranks matching entities according to an entity activity level. In one example, in response to two or more entities satisfying a query and being connected to the member by a similar number of connections, the entity module 240 ranks the entities according to activity level. For example, in response to one entity visiting the social networking service 100 more frequently than the other, the first entity is ranked above the second entity.

In one example embodiment, the entity module 240 limits a search for entity to those that are within a threshold network connection distance from the member. In one example, a threshold network connection distance is five and the entity module 240 limits searching for connected entities to those that are connected and have a network connection distance of five or less.

In another example embodiment, in response to the entity module 240 not finding any matching entities, the entity module 240 increases the threshold connection distance. For example, in response to not finding any matching entities after searching a network connection distance of five, the entity module 240 may increase the network connection distance to seven, or more. Of course, other values may be used and this disclosure is not limited in this regard.

In one example embodiment, the entity module 240 applies the character edit distance to separate terms in a name of an entity. In one example, a member has a first name and a last name. In this example, the entity module 240 determines entities at the social networking service 100 having a first name with a character edit distance below the threshold amount and a last name with a character edit distance that is below the threshold amount.

In another example embodiment, the entity module 240 ranks matching named entities according to a number of common connections between the member and the named entities. In one example, both the member and named entities are connected to other members of the social networking service 100. The entity module 240 may rank the matching named entities according to a number of other members that are directly connected to both the member and the named entities.

In one example embodiment, the entity module 240 ranks matching named entities according to a minimum number of connections between the member and the ranked entities. For example, named entities that are directly connected to the member are ranked higher than named entities that are connected to the member at a minimum connection distance of 2, and so on.

In another example embodiment, the entity module 240 ranks matching named entities according to common profile parameters between the member and the named entity. Examples include, the member and the named entity having attended the same academic institution, the member and the named entity having been employed by the same employer, the member and the named entity having lived at the same location, or other profile similarities, or personal attributes.

In one example embodiment, the modification module 260 is configured to modify the member input by replacing the spelling of an entity included in the input with the spelling of one of the matching named entities. In one example, the modification module 260 replaces the spelling of the named entity in the input with a spelling of the highest ranking named entity.

In one example embodiment, the modification module 260 stores the modification for the member. For example, the modification module 260 may write the modification on a hardware storage medium. In another example, the modification includes an input named entity and a matching named entity to replace the named entity.

In one example embodiment, the modification module 260 trains a machine learning system 160 to identify a named entity according to factors associated with the member and the matching named entities as previously described. In one example, inputs to the machine learning system 160 include a number of connections between the member and the named entity, a number of terms that exactly match (e.g., first name, last name, or the like).

In another example embodiment, a factor includes a member submitting input, then submitting input that is within a character edit distance of three. Such a scenario may be viewed as a correction and is a factor the machine learning system 160 may train on. Furthermore, in response to the user selecting, or otherwise interacting with, results received after the correction, such an increased response is also a data point to be included in the machine learning system 160.

In one specific example, the machine learning system 160 is a logistic regression model trained on one or more of the following features: common connections between the member and the named entity, connection degree between the member and the named entity, a number of connections between the member and the named entity, a profile quality score, headline query similarity, a minimum number of terms matching in profile bodies between the member and the named entity, Jaccard Similarity in a query headline, a portion of profile body text matching between the member and the named entity, a portion of first name matching between the input and the named entity, a portion of last name matching between the input and the named entity, or the like. In another example embodiment, the machine learning system 160 trains on each of the factors previously described.

In one example embodiment, the query modification system 150 collects data on member spelling corrections, correction suggestions (e.g., the member selecting an optional correction provided by the social networking service 100) and trains the machine learning system 160 on the corrections. For example, the machine learning system 160 may be a neural network with the various features previously described being inputs to the neural network.

A query modification system 150 configured as described herein has the technical benefit of resolving named entities to those entities that are more likely intended by a member submitting a named entity. Where a social networking service (e.g., the service 100) may include hundreds of millions of members and/or named entities, a named entity provided by a member may match many different entities. Thus, a system, as described herein, more accurately determines intended named entities indicated by a member of the social networking service.

In one example embodiment, the query modification system 150 modifies the member input in response to the machine learning system 160 outputting a value that is above a threshold value, and does not modify the member input in response to the output being below the threshold value.

In another example embodiment, the machine learning system 160 is trained on member reformulations. In this example, a member may indicate an initial named entity. In response to reformulating the spelling of the initial named entity and subsequently interacting with results of the reformulation (e.g., selecting a matching named entity), the query modification system 150 stores this as a data point to be used by the machine learning system 160 to train. As other members interact with the query modification system 150 in similar ways, the query modification system 150 stores many such examples as data points. These examples are used to train the machine learning system 160.

In one example embodiment, the modification module 260 ranks named entities according to a connection distance to the member. For example, where multiple named entities match the member input, the modification module 260 may suggest the named entity that is most closely connected with the member (e.g., having a lowest network connection distance).

In another example embodiment, the entity module 240 expands a search for matching named entities to those named entities with whom the member has communicated. For example, in response to no named entities being connected to the member, the entity module 240 includes named entities that the member has transmitted a message to.

Figure 3:
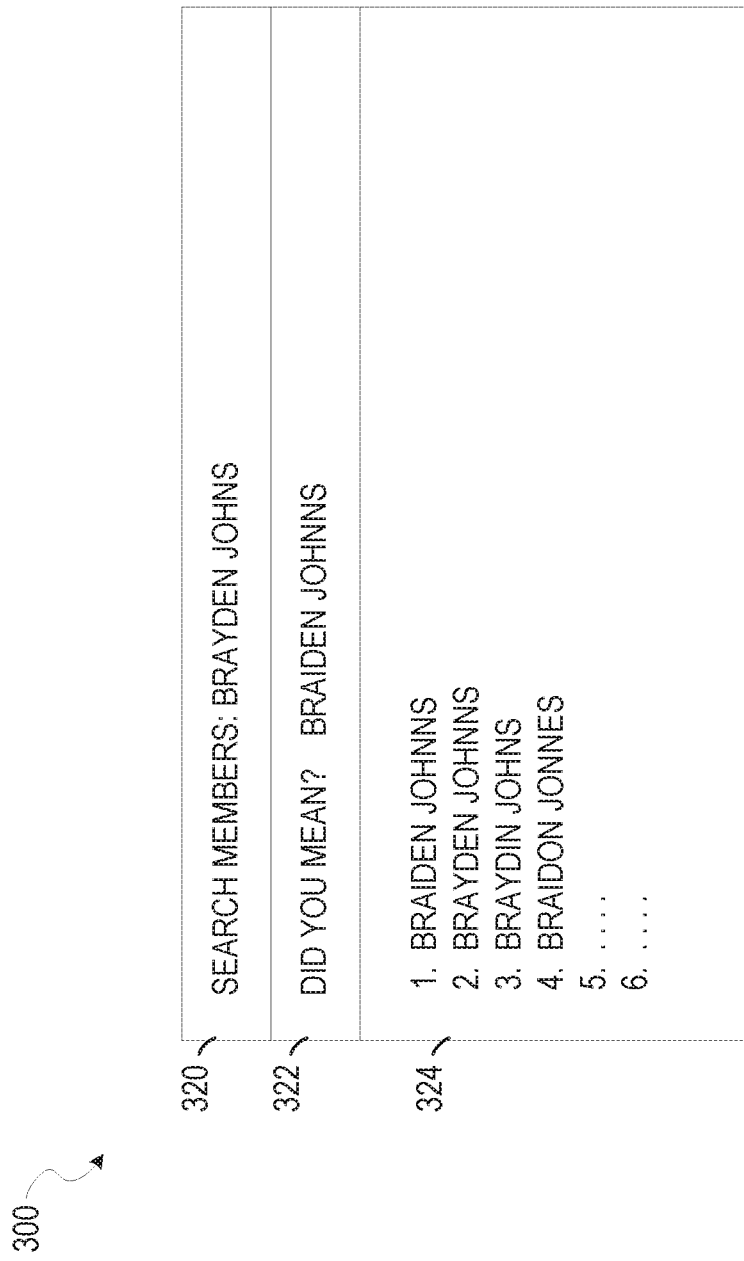
FIG. 3 is another illustration depicting a user interface according to one example embodiment.

FIG. 3 is an illustration depicting a user interface 300 according to one example embodiment. In this example embodiment, the user interface 300 includes a text box 320 for receiving member input (e.g., "Brayden Johns"), a text box 322 for recommending a named entity (e.g., "Braiden Johnns"), and a text box 324 for displaying a set of matching named entities at the social networking service 100. In this particular example, the recommended named entities include "Braiden Johnns," "Brayden Johnns," "Braydin Johns," and "Braidon Jonnes." Of course, other similar named entities may be displayed and this disclosure is not limited in this regard.

In another example embodiment, the query modification system 150 asks the member whether the member really meant another named entity. In the box text 322, the query modification system 150 displayed a recommended replacement entity, or a highest ranked named entity.

FIG. 4 is an illustration depicting a social network 400 according to one example embodiment. In this example embodiment, the social network 400 includes a member 450 and a set of named entities 460, 462, 464, 466, and 468.

In one example embodiment, the member 450 submits a query for a named entity "Brayden Jonns," and the input module 220 modifies the query to include all named entities in the social network 400 that are spelled within a threshold character edit distance from "Brayden Jonns." in this example, the set of named entities at the social networking service 100 include Brayden Jonns 468, Braiden Jonns 466, Braydin Johns 464, Braidon Jonnes 462, and Braiden Johnns 460.

In another example embodiment, the entity module 240 ranks the entities in the set of named entities that are most closely connected with the member. In this example, Braiden Johnns 460 is directly connected (e.g., via network connection 402) to the member 450 because there are no other members that are connected between them.

In this example, Brayden Jonns 468 is connected to the member 450 via connections 404, 406, and 408. Thus, Brayden Jonns 468 has a network connection distance of 3 from the member 450. Because Braiden Johnns 460 is most closely connected with the member 450, the entity module 240 ranks Braiden Johnns 460 higher than Brayden Jonns 468. This is the case even though the spelling of named entity Brayden Jonns 468 more closely matches the named entity included in the member input.

After identifying the named entity that is more highly ranked than "Brayden) onus," the modification module 260 modifies the member input that includes "Brayden Jonns" with "Braiden Johnns" even though the spelling differs from the spelling provided by the member 450.

In one example embodiment, the modification module 260 displays a highest ranked named entity as an alternative entity. In response to the member 450 indicating acceptance of the alternative entity, the modification module 260 modifies the member input by replacing the spelling of "Brayden Jonns" with "Braiden Johnns." Thus, the query modification system 150 infers that the member 450 means to select "Braiden. Johnns" 460 because "Braiden Johnns" is more highly ranked by a machine learning system 160 according to the factors previously described.

Figure 5:
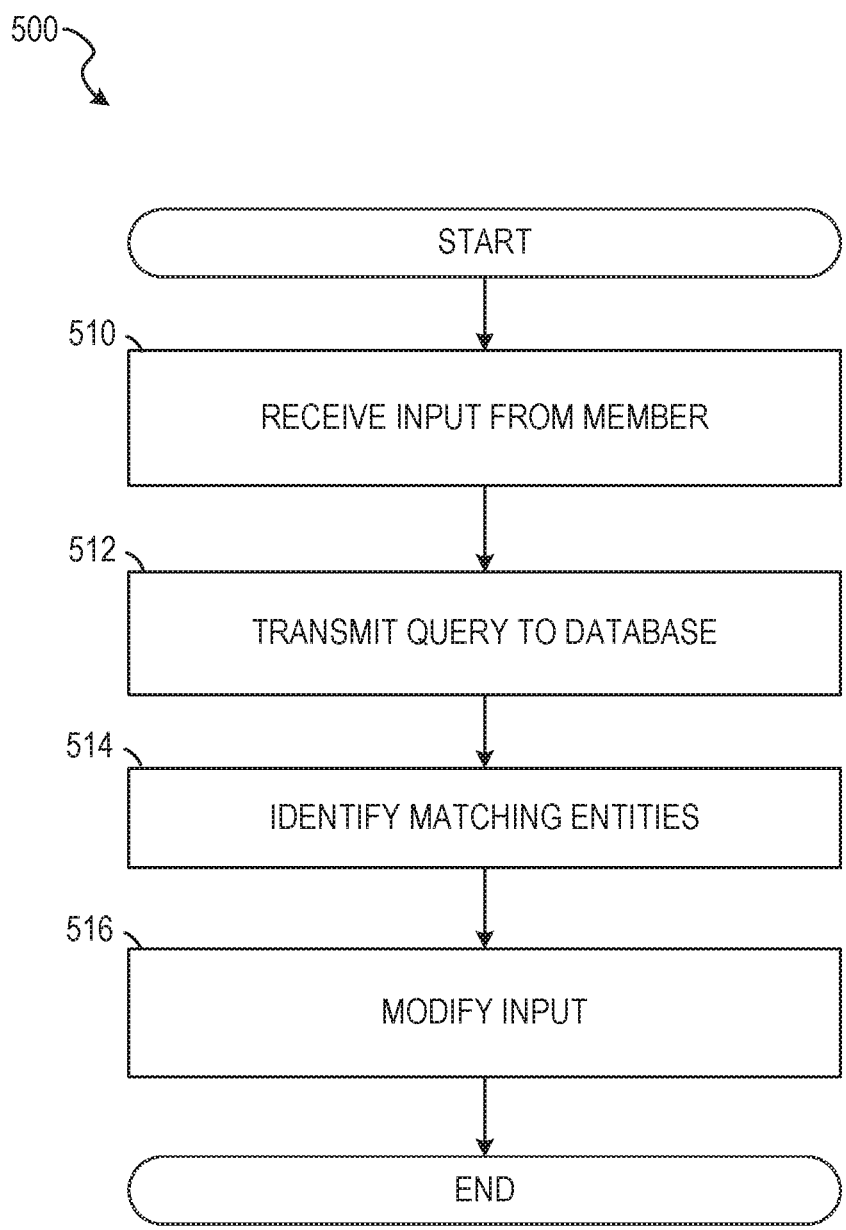
FIG. 5 is a flow chart diagram illustrating a method of querying named entities according to one example embodiment.

FIG. 5 is a flow chart diagram illustrating a method 500 of querying named entities according to one example embodiment. Operations in the method 500 may be performed by one or more of the modules described in FIG. 2. The method 500 includes operations 510, 512, 514, and 516.

In one example embodiment, the method 500 begins and at operation 510 the input module 220 receives electronic input from a member of a social networking service 100 that includes a named entity. For example, the input module 220 may receive text input via an electronic user interface.

The method 500 continues at operation 512 and the entity module 240 transmits a query to a database of entities connected to the social networking service 100 to select a set of entities in the database whose names are within a character edit distance of a spelling of the named entity. In one example, the entity module 240 generates alternative spellings of the named entity and includes each of the alternative spellings in an SQL query to be transmitted to the database 112.

The method 500 continues at operation 514 and the entity module 240 identifies a matching entity that is connected to the member at the social networking service 100 and matches an entity in the set of entities.

The method 500 continues at operation 516 and the modification module 260 modifies the input by replacing the spelling of the named entity with a spelling of the matching entity. In one example, the modification module 260 replaces characters in the input with the spelling of the matching entity.

Figure 6:
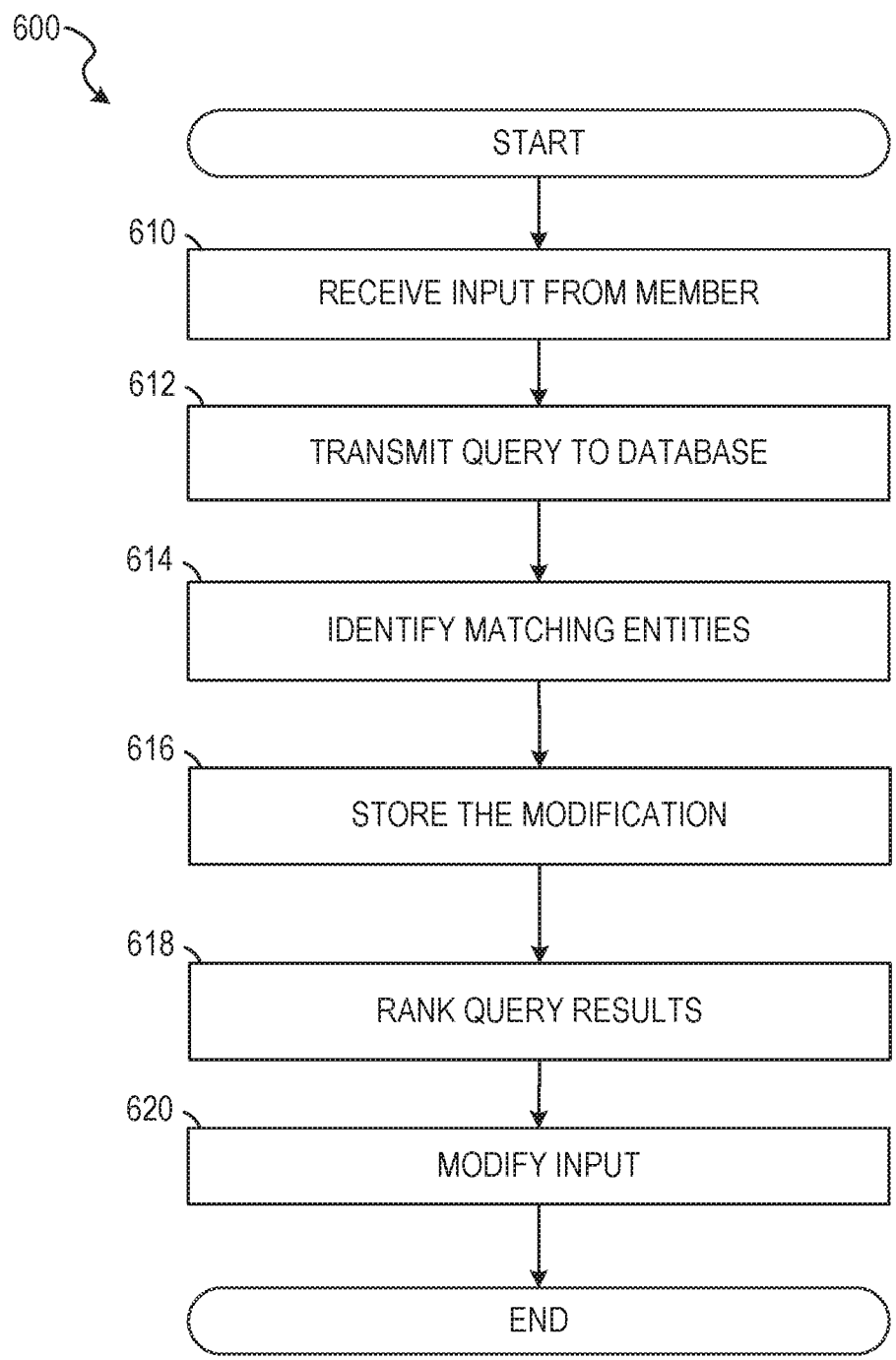
FIG. 6 is a flow chart diagram illustrating another method of querying named entities according to one example embodiment.

FIG. 6 is a flow chart diagram illustrating another method 600 of querying named entities according to one example embodiment. Operations in the method 600 may be performed by one or more of the modules described in FIG. 4. The method 600 includes operations 610, 612, 614, 616, 618, and 620.

In one example embodiment, the method 600 begins and at operation 610 the input module 220 receives electronic input from a member of a social networking service (e.g., the social networking service 100) that includes a named entity. For example, the input module 220 may receive one or more network packets from a client device being used by the member and that include the input.

The method 600 continues at operation 612 and the entity module 240 transmits a query to a database of entities connected to the social networking service to select a set of entities in the database whose names are within a character edit distance of a spelling of the named entity.

The method 600 continues at operation 614 and the entity module 240 identifies matching entities that are connected to the member at the social networking service 100 and match an entity in the set of entities.

The method 600 continues at operation 616 and the modification module 260 stores a modification that includes the named entity provided by the member, the replacement named entity, and the member. In this way, in a subsequent event, in response to the member providing the original named entity, the query modification system 150 may modify the named entity to be the matching entity without applying the machine learning system 160 because the modification has already been made and stored. In one example, the modification module 260 stores the modification in a file. In another example, the modification module 260 stores the modification in a remote database of modifications.

The method 600 continues at operation 618 and the entity module 240 ranks named entities that are within the threshold character edit distance from the named entity provided by the member according to a network distance, or other factors previously described. In one example, the entity module 240 displays a highest ranked named entity as a recommended entity.

The method 600 continues at operation 620 and the modification module 260 modifies the input by replacing the spelling of the named entity with a spelling of the matching entity. In one example, the modification module 260 replaces characters in the input with the spelling of the matching entity.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 2-6 are implemented, in some embodiments, in the context of a machine and an associated software architecture. The sections below describe representative software architectures and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "Internet of Things," while yet another combination produces a server computer for use within a cloud computing architecture. Not all combinations of such software and hardware architectures are presented here as those of skill in the art can readily understand how to implement the inventive subject matter in different contexts from the disclosure contained herein.

Software Architecture

Figure 7:
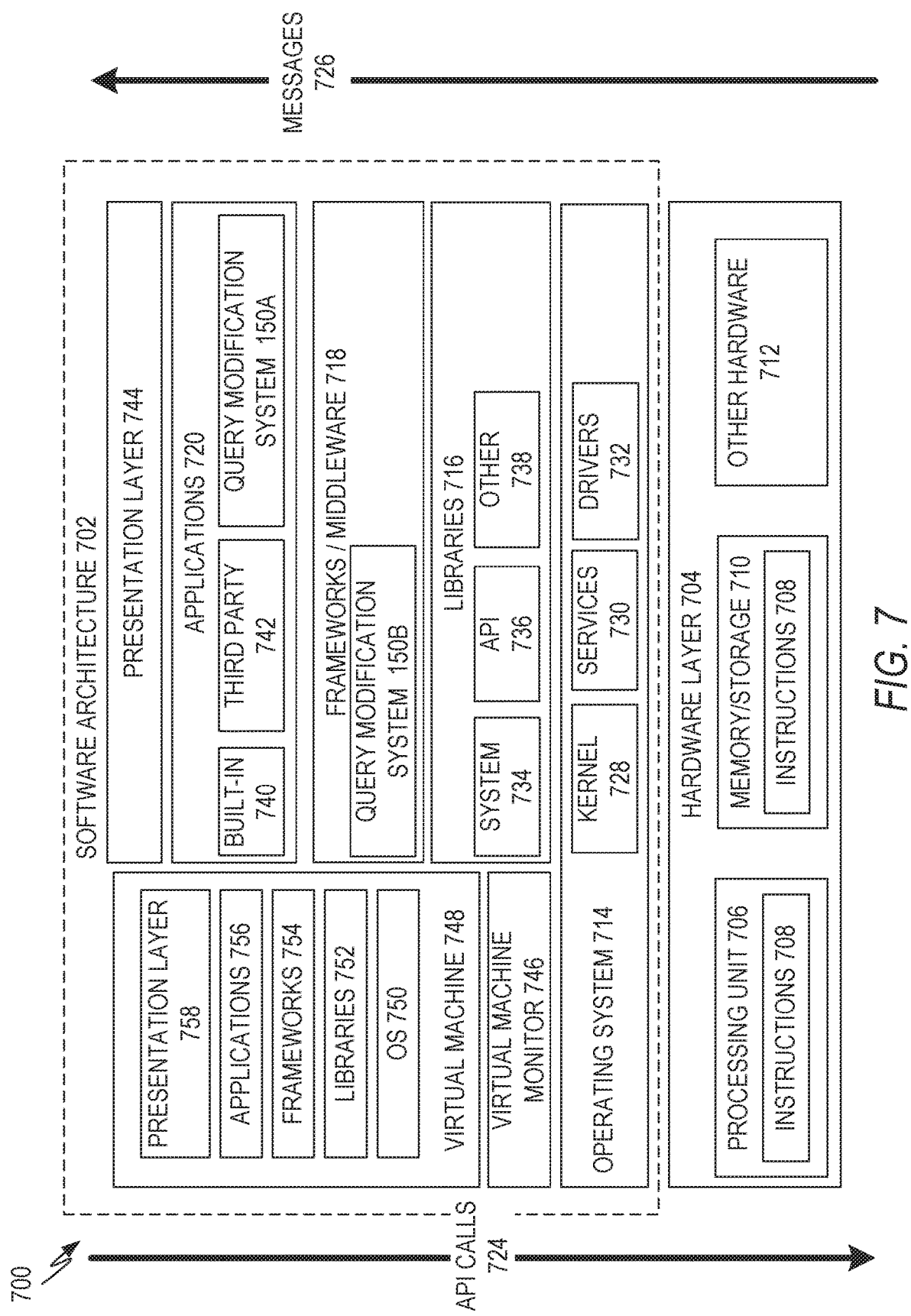
FIG. 7 is a block diagram illustrating an example of a software architecture that may be installed on a machine, according to some example embodiments.

FIG. 7 is a block diagram 700 illustrating a representative software architecture 702, which may be used in conjunction with various hardware architectures herein described. FIG. 7 is merely a non-limiting example of a software architecture 702, and it will be appreciated that many other architectures may be implemented to facilitate the functionality described herein. The software architecture 702 may be executing on hardware such as machine 800 of FIG. 8 that includes, among other things, processors 810, memory/storage 830, and I/O components 850. A representative hardware layer 704 is illustrated and can represent, for example, the machine 800 of FIG. 8. The representative hardware layer 704 comprises one or more processing units 706 having associated executable instructions 708. Executable instructions 708 represent the executable instructions of the software architecture 702, including implementation of the methods, modules and so forth of FIGS. 2-7. Hardware layer 704 also includes memory and/or storage 710, which also have executable instructions 708. Hardware layer 704 may also comprise other hardware 712 which represents any other hardware of the hardware layer 704, such as the other hardware illustrated as part of machine 800.

In the example architecture of FIG. 7, the software architecture 702 may be conceptualized as a stack of layers where each layer provides particular functionality. For example, the software architecture 702 includes layers, such as an operating system 714, libraries 716, frameworks/middleware 718, applications 720, and presentation layer 744. Operationally, the applications 720 or other components within the layers may invoke application programming interface (API) calls 724 through the software stack and receive a response, returned values, and so forth illustrated as messages 726 in response to the API calls 724. The layers illustrated are representative in nature and not all software architectures have all layers. For example, some mobile or special purpose operating systems may not provide a frameworks/middleware 718 layer, while others may provide such a layer. Other software architectures may include additional or different layers.

The operating system 714 manages hardware resources and provide common services. The operating system 714 may include, for example, a kernel 728, services 730, and drivers 732. The kernel 728 acts as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 are responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 provide a common infrastructure that may be utilized by the applications 720 or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 716 may include system libraries 734 (e.g., C standard library) that provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

In one example embodiment, the query modification system 150 is implemented as an application. In another example embodiment, the query modification system 150 is implemented as a framework and/or middleware. In one example, the input module 220 uses one or more libraries 716 to receive or parse user input in a user session.

The frameworks/middleware 718 (also sometimes referred to as middleware) may provide a higher-level common infrastructure that may be utilized by the applications 720 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 and/or other software components/modules, some of which may be specific to a particular operating system or platform.

The applications 720 include built-in applications 740 or third-party applications 742. Examples of representative built-in applications 740 may include, but are not limited to, a contacts application, a browser application, a book reader application, a location application, a media application, a messaging application, or a game application. Third-party applications 742 may include any of the built-in applications 740 as well as a broad assortment of other applications. In a specific example, the third-party application 742 (e.g., an application developed using the Android™ or iOS™ software development kit (SDK) by an entity other than the vendor of the particular platform) is mobile software running on a mobile operating system such as iOS™, Android™, Windows® Phone, or other mobile operating systems. In this example, the third-party application 742 invokes the API calls 724 provided by the mobile operating system, such as operating system 714, to facilitate functionality described herein.

In one example embodiment, one or more of the modules described in FIG. 2 are at least partially implemented as applications 720. The applications 720 may utilize built-in operating system functions (e.g., kernel 728, services 730, or drivers 732), libraries (e.g., system libraries 734, API libraries 736, and other libraries 738), or frameworks/middleware 718 to create user interfaces to interact with users of the query modification system 150. Alternatively, or additionally, in some systems interactions with a user may occur through a presentation layer, such as presentation layer 744. In these systems, the application/module "logic" can be separated from the aspects of the application/module that interact with a user.

Some software architectures utilize virtual machines. In the example of FIG. 7, this is illustrated by virtual machine 748. A virtual machine creates a software environment where applications/modules can execute as if they were executing on a hardware machine (such as the machine 800 of FIG. 8, for example). The virtual machine 748 is hosted by a host operating system (operating system 714 in FIG. 7) and typically, although not always, has a virtual machine monitor 746, which manages the operation of the virtual machine 748 as well as the interface with the host operating system (e.g., operating system 714). A software architecture executes within the virtual machine 748 such as an operating system 750, libraries 752, frameworks/middleware 754, applications 756, or presentation layer 758. These layers of software architecture executing within the virtual machine 748 can be the same as corresponding layers previously described or may be different.

Example Machine Architecture and Machine-Readable Medium

Figure 8:
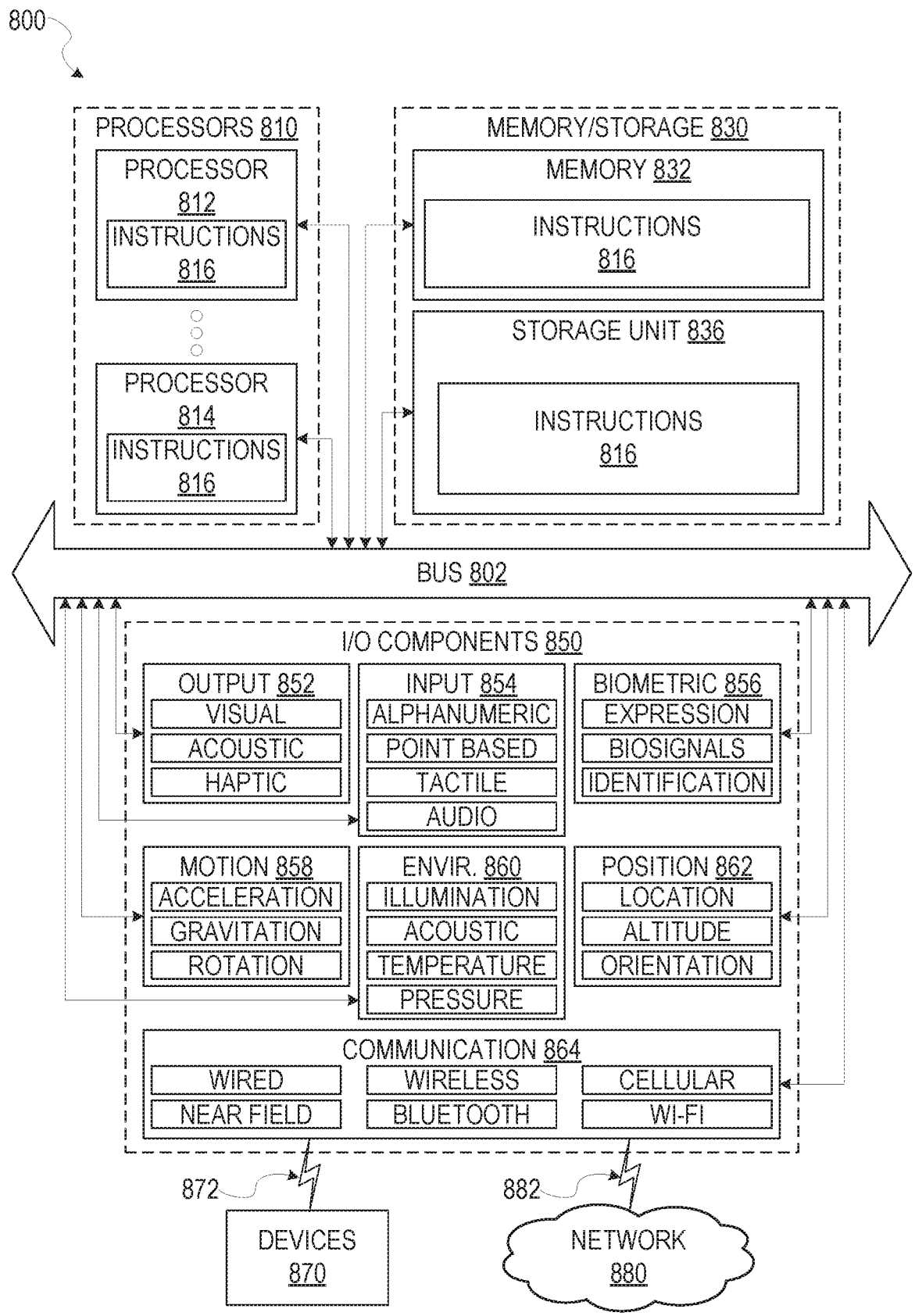
FIG. 8 illustrates a diagrammatic representation of a machine in the form of a computer system within which a set of instructions may be executed for causing the machine to perform any one or more of the methodologies discussed herein, according to an example embodiment.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the flow diagrams of FIGS. 5-6. The instructions 816 transform the general, non-programmed machine into a particular machine programmed to carry out the described and illustrated functions in the manner described.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (SIB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory/storage 830, and I/O components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific integrated Circuit (ASIC), a Radio-Frequency Integrated Circuit (RFIC), another processor, or any suitable combination thereof) may include, for example, processor 812 and processor 814 that may execute instructions 816. The term "processor" is intended to include multi-core processor that may comprise two or more independent processors (sometimes referred to as "cores") that may execute instructions contemporaneously. Although FIG. 8 shows multiple processors 810, the machine 800 may include a single processor with a single core, a single processor with multiple cores (e.g., a multi-core process), multiple processors with a single core, multiple processors with multiples cores, or any combination thereof.

The memory/storage 830 may include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of processors 810 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), or any suitable combination thereof. The term "machine-readable medium" should be taken to include a single medium or multiple media (e.g., a centralized or distributed database, or associated caches and servers) able to store instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 850 include biometric components 856, motion components 858, environmental components 860, or position components 862 among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via coupling 882 and coupling 872, respectively. For example, the communication components 864 may include a network interface component or other suitable device to interface with the network 880. In further examples, communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geo-location, location via Wi-Fi® signal triangulation, location via detecting an NFC beacon signal that may indicate a particular location, and so forth.

In one example embodiment, the input module 220 may receive the user strings from a communication device 870. The input module 220 may also store received user string via the storage unit 836. In another embodiment, the input module 220 receives the user strings via an alpha-numeric input component 854.

Transmission Medium

In various example embodiments, one or more portions of the network 880 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or other type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to devices 870. The term "transmission medium" shall be taken to include any intangible medium that is capable of storing, encoding, or carrying instructions 816 for execution by the machine 800, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   receiving electronic input from a member of a social networking service, the electronic input comprising a named entity;
   transmitting a query including the electronic input to a database of entities accessible to the social networking service;
   selecting a set of matching named entities in the database whose names match the spelling of the named entity, or are within a predetermined character edit distance of a spelling of the named entity;
   ranking each named entity in the set of matching ties based in part on i) a measure of the network connection distance between each named entity and the member, and ii) the number of common connections shared between each named entity and the member;
   selecting for presentation via a user interface at least one named entity from the matching set of named entities with a name spelled differently than the spelling of the named entity as received via the electronic input by the member, but within a predetermined character edit distance of the spelling of the named entity, wherein the at least one selected named entity has been ranked higher than at least one named entity in the set of matching named entities with a name that matches the spelling of the named entity as received via electronic input by the member;
   presenting the at least one selected named entity from the ranked set of matching named entities via a user interface.

2. The method of claim 1, wherein said step of selecting a set of matching named entities is limited to selecting named entities that are a threshold network connection distance from the member, the method further comprising increasing the threshold network connection distance in response to not identifying a matching named entity within the initial threshold network connection distance.

3. The method of claim 1, wherein said step selecting a set of matching named entities comprises applying a machine learning system to identify the named entities at the social networking service according to a set of factors.

4. The method of claim 1, wherein said step of selecting a set of matching named entities further comprises identifying named entities at the social networking service that share common entity profile attributes with the member.

5. The method of claim 1, wherein ranking each named entity in the set of matching named entities based in part on the member has transmitted one or more messages via the social networking service.

6. The method of claim 1, wherein ranking each named entities in the set of matching named entities involves determining a threshold number of common connections between the member and the matching entity.

7. A system comprising:
a machine-readable memory having instructions stored thereon, which, when executed by a processor, cause the processor to perform operations comprising:
receiving electronic input from a member of a social networking service, the electronic input comprising a named entity;
transmitting a query including the electronic input to a database of entities accessible to the social networking service;
selecting a set of matching named entities in the database whose names match the spelling of the named entity, or are within a predetermined character edit distance of a spelling of the named entity;
ranking each named entity in the set of matching entities based in part on i) a measure of the network connection distance between each named entity and the member, and ii) the number of common connections shared between each named entity and the member;
selecting for presentation via a user interface at least one named entity from the matching set of named entities with a name spelled differently than the spelling of the named entity as received via the electronic input by the member, but within a predetermined character edit distance of the spelling of the named entity, wherein the at least one selected named entity has been ranked higher than at least one named entity in the set of matching named entities with a name that matches the spelling of the named entity as received via electronic input by the member;
presenting the at least one selected named entity from the ranked set of matching named entities via a user interface.

8. The system of claim 7, wherein said step of selecting a set of matching named entities is limited to selecting named entities that are a threshold network connection distance from the member, the operations further comprising increasing the threshold network connection distance in response to not identifying a matching named entity within the initial threshold network connection distance.

9. The system of claim 7, wherein said step selecting a set of matching named entities comprises applying a machine learning system to identify the named entity at the social networking service according to a set of factors.

10. The system of claim 7, wherein said step selecting a set of matching named entities further comprises selecting named entities at the social networking service that share common entity profile attributes with the member.

11. The system of claim 7, wherein ranking each named entity in the set of matching named entities based in part on the member has transmitted one or more messages via the social networking service.

12. The method of claim 7, wherein ranking each named entity in the set of matching named entities involves determining a threshold number of common connections between the member and the matching entity.

13. A machine-readable hardware medium having instructions stored thereon, which, when executed by a processor, cause the processor to perform operations comprising:
receiving electronic input from a member of a social networking service, the electronic input comprising a named entity;
transmitting a query including the electronic input to a database of entities accessible to the social networking service;
selecting a set of matching named entities in the database whose names match the spelling of the named entity, or are within a predetermined character edit distance of a spelling of the named entity;
ranking each named entity in the set of matching entities based in part on i) a measure of the network connection distance between each named entity and the member, and ii) the number of common connections shared between each named entity and the member;
selecting for presentation via a user interface at least one named entity from the matching set of named entities with a name spelled differently than the spelling of the named entity as received via the electronic input by the member, but within a predetermined character edit distance of the spelling of the named entity, wherein the at least one selected named entity has been ranked higher than at least one named entity in the set of matching named entities with a name that matches the spelling of the named entity as received via electronic input by the member;
presenting the at least one selected named entity from the ranked set of matching named entities via a user interface.

14. The machine-readable hardware medium of claim 13, wherein said step of selecting a set of matching named entities is limited to selecting named entities that are a threshold network connection distance from the member, the method further comprising increasing the threshold network connection distance in response to not identifying a matching named entity within the initial threshold network connection distance.

15. The machine-readable hardware medium of claim 13, wherein said step selecting a set of matching named entities comprises applying a machine learning system to identify the named entities at the social networking service according to a set of factors.

16. The machine-readable hardware medium of claim 13, wherein said step of selecting a set of matching named entities further comprises identifying named entities at the social networking service that share common entity profile attributes with the member.

17. The machine-readable hardware medium of claim 13, wherein ranking each named entities in the set of matching named entities involves determining a threshold number of common connections between the member and the matching entity.

* * * * *

UNITED STATES PATENT AND TRADEMARK OFFICE
CERTIFICATE OF CORRECTION

PATENT NO. : 10,896,231 B2
APPLICATION NO. : 15/856383
DATED : January 19, 2021
INVENTOR(S) : Muthuregunathan et al.

Page 1 of 1

It is certified that error appears in the above-identified patent and that said Letters Patent is hereby corrected as shown below:

In the Claims

In Column 18, Line 49, in Claim 1, delete "ties" and insert --entities-- therefor Signed and Sealed this
Twentieth Day of April, 2021

Drew Hirshfeld
*Performing the Functions and Duties of the
Under Secretary of Commerce for Intellectual Property and
Director of the United States Patent and Trademark Office*